US009910259B2

(12) United States Patent
Armbruster et al.

(10) Patent No.: US 9,910,259 B2
(45) Date of Patent: Mar. 6, 2018

(54) MODULAR HOLOGRAPHIC SIGHTING SYSTEM

(71) Applicant: Corey D. Zieger, Port Huron, MI (US)

(72) Inventors: Robin C. Armbruster, Livonia, MI (US); Joseph Anthony Brincat, Livonia, MI (US); Robert H. Fish, Livonia, MI (US); Paul Karatsinides, Livonia, MI (US); Kenneth M. Junkins, Livonia, MI (US)

(73) Assignee: Corey Zieger, Port Huron, MI (US)

( * ) Notice: Subject to any disclaimer, the term of this patent is extended or adjusted under 35 U.S.C. 154(b) by 0 days.

(21) Appl. No.: 14/903,537

(22) PCT Filed: Jul. 7, 2014

(86) PCT No.: PCT/US2014/045589
§ 371 (c)(1),
(2) Date: Jan. 7, 2016

(87) PCT Pub. No.: WO2015/006222
PCT Pub. Date: Jan. 15, 2015

(65) Prior Publication Data
US 2016/0161735 A1    Jun. 9, 2016

Related U.S. Application Data

(60) Provisional application No. 61/844,254, filed on Jul. 9, 2013.

(51) Int. Cl.
G02B 5/32          (2006.01)
G02B 23/14        (2006.01)
(Continued)

(52) U.S. Cl.
CPC .............. *G02B 23/14* (2013.01); *F41G 1/14* (2013.01); *F41G 1/345* (2013.01); *G02B 5/32* (2013.01);
(Continued)

(58) Field of Classification Search
CPC .... G02B 5/32; G02B 5/0252; G02B 27/0025; G02B 23/14; G02B 27/20; G02B 5/203;
(Continued)

(56) References Cited

U.S. PATENT DOCUMENTS 4,012,150 A    3/1977  Upatnieks
5,020,892 A    6/1991  Glover et al.
(Continued)

FOREIGN PATENT DOCUMENTS

CN    102175096 A    9/2011
EP    1154284 A1    11/2001
(Continued)

OTHER PUBLICATIONS

International Search Report and Written Opinio for co-pending application No. PCT/US2014/046692, filed Jul. 15, 2014.
(Continued)

*Primary Examiner* — Jade R Chwasz
(74) *Attorney, Agent, or Firm* — Vivacqua Law, PLLC

(57) ABSTRACT

A lightweight holographic sighting system is provided that is designed to minimize optical aberrations common with earlier holographic sighting systems. The system has a modular construction that is more economic and conducive to high volume production, in terms of complexity of required fixturing and availability of materials, than earlier systems. The system is lighter and more compact, while providing a larger field of view than existing systems, and can be used on small hand guns, standard size firearms, bows, telescopes, and other devices without adding signifi- (Continued)

cant weight or space constraints. The system utilizes an upper housing assembly containing a high efficiency holographic optical element, an anti-reflective glass viewing window, and a red diode laser light source driven by a high efficiency microcontroller circuit designed for increased battery life, and a lower housing assembly containing two dielectric folding mirrors, an on-axis collimating lens, and a high efficiency achromatizing holographic optical element.

21 Claims, 15 Drawing Sheets

(51) Int. Cl.
F41G 1/14 (2006.01)
F41G 1/34 (2006.01)
G02B 27/20 (2006.01)
G02B 27/42 (2006.01)
G02B 17/02 (2006.01)
G02B 19/00 (2006.01)
G02B 27/00 (2006.01)

(52) U.S. Cl.
CPC ....... *G02B 17/023* (2013.01); *G02B 19/0052* (2013.01); *G02B 27/0025* (2013.01); *G02B 27/20* (2013.01); *G02B 27/42* (2013.01)

(58) Field of Classification Search
CPC .............. G02B 17/023; G02B 19/0052; G02B 5/1876; F41G 1/14; F41G 1/30; F41G 1/345; G03H 1/0005; G03H 2001/0077; G03H 2001/0439
USPC ..................................................... 359/15, 19
See application file for complete search history.

(56) References Cited

U.S. PATENT DOCUMENTS

| | | | |
|---|---|---|---|
| 5,473,447 A * | 12/1995 | Molteni | G02B 27/0103 359/13 |
| 5,483,362 A | 1/1996 | Tai et al. | |
| 5,706,600 A | 1/1998 | Toole et al. | |
| 5,754,574 A | 5/1998 | Lofthouse-Zeis et al. | |
| 5,784,182 A | 7/1998 | Francoeur et al. | |
| 5,815,936 A * | 10/1998 | Sieczka | G03H 1/0005 359/1 |
| 6,101,200 A | 8/2000 | Burbidge et al. | |
| 6,490,060 B1 | 12/2002 | Tai et al. | |
| 6,654,152 B2 | 11/2003 | Jacobowitz et al. | |
| 6,738,187 B2 | 5/2004 | DeCusatis et al. | |
| 6,751,014 B2 | 6/2004 | DeCusatis et al. | |
| 6,947,458 B2 | 9/2005 | Moriarty et al. | |
| 7,069,685 B2 * | 7/2006 | Houde-Walter | F41C 27/00 42/113 |
| 7,145,703 B2 | 12/2006 | Sieczka et al. | |
| 7,190,904 B2 | 3/2007 | DeCusatis et al. | |
| 7,356,057 B2 | 4/2008 | Deng et al. | |
| 7,542,189 B2 | 6/2009 | Tanimura et al. | |
| 8,208,507 B2 | 6/2012 | Lerner et al. | |
| 8,233,209 B2 | 7/2012 | Miyatake et al. | |
| 8,235,605 B2 | 8/2012 | Kim | |
| 8,345,719 B2 | 1/2013 | Moench et al. | |
| 8,559,821 B2 | 10/2013 | Wen et al. | |
| 8,578,646 B2 | 11/2013 | Joannes | |
| 8,605,763 B2 | 12/2013 | Castillo et al. | |
| 8,607,495 B2 | 12/2013 | Moore et al. | |
| 8,638,387 B2 | 1/2014 | Aizpuru et al. | |
| 8,739,454 B2 | 6/2014 | Erdle et al. | |
| 8,756,852 B2 | 6/2014 | Kramer et al. | |
| 8,833,655 B2 | 9/2014 | McCarty et al. | |
| 8,837,877 B2 | 9/2014 | Kimerling et al. | |
| 8,850,950 B2 | 10/2014 | Deckard et al. | |
| 8,879,146 B2 | 11/2014 | Lorocco et al. | |
| 8,887,430 B2 | 11/2014 | Wichner | |
| 8,888,491 B2 | 11/2014 | Carter | |
| 2005/0073690 A1 | 4/2005 | Abbink et al. | |
| 2005/0082553 A1 | 4/2005 | Yamamoto et al. | |
| 2005/0188583 A1 | 9/2005 | Jackson et al. | |
| 2005/0225853 A1 | 10/2005 | Hakansson et al. | |
| 2006/0022213 A1 | 2/2006 | Posamentier | |
| 2006/0164704 A1 | 7/2006 | Sieczka et al. | |
| 2006/0182441 A1 | 8/2006 | Kish et al. | |
| 2008/0031294 A1 | 2/2008 | Krishnamoorthy et al. | |
| 2008/0104875 A1 * | 5/2008 | Mayerle | F41G 1/41 42/118 |
| 2011/0031903 A1 | 2/2011 | Nguyen Hoang et al. | |
| 2011/0129227 A1 | 6/2011 | Wen et al. | |
| 2011/0164633 A1 | 7/2011 | Moench et al. | |
| 2011/0185619 A1 | 8/2011 | Finnegan et al. | |
| 2011/0228366 A1 * | 9/2011 | Liu | F41G 1/30 359/15 |
| 2011/0228803 A1 | 9/2011 | Guenter et al. | |
| 2012/0033195 A1 | 2/2012 | Tai | |
| 2014/0026464 A1 | 1/2014 | Wiklund | |
| 2014/0056322 A1 | 2/2014 | Castillo et al. | |
| 2014/0109457 A1 | 4/2014 | Speroni | |
| 2014/0130395 A1 | 5/2014 | Scroggins | |
| 2014/0160475 A1 | 6/2014 | Kingsbury et al. | |
| 2014/0169390 A1 | 6/2014 | Spiekermann | |
| 2014/0238429 A1 | 8/2014 | Mizuno et al. | |
| 2014/0268323 A1 | 9/2014 | Feinberg | |
| 2014/0283431 A1 | 9/2014 | Tuller, Jr. et al. | |
| 2014/0290113 A1 | 10/2014 | Thomas et al. | |
| 2014/0290114 A1 | 10/2014 | Thomas et al. | |
| 2014/0295380 A1 | 10/2014 | Amis et al. | |
| 2014/0305022 A1 | 10/2014 | Chung | |
| 2014/0305023 A1 | 10/2014 | Moore et al. | |
| 2014/0305025 A1 | 10/2014 | Tubb | |
| 2014/0315156 A1 | 10/2014 | Averill | |
| 2014/0319217 A1 | 10/2014 | Etefante | |
| 2014/0334058 A1 | 11/2014 | Galvan et al. | |

FOREIGN PATENT DOCUMENTS

| | | |
|---|---|---|
| WO | WO-200050836 A1 | 8/2000 |
| WO | WO-2007011803 A2 | 1/2007 |
| WO | WO-2009044387 | 4/2009 |
| WO | WO-2014056105 A2 | 4/2014 |

OTHER PUBLICATIONS

Supplementary European Search Report dated Mar. 3, 2017 for European Application No. EP 14822798.6 filed Feb. 9, 2016.

* cited by examiner

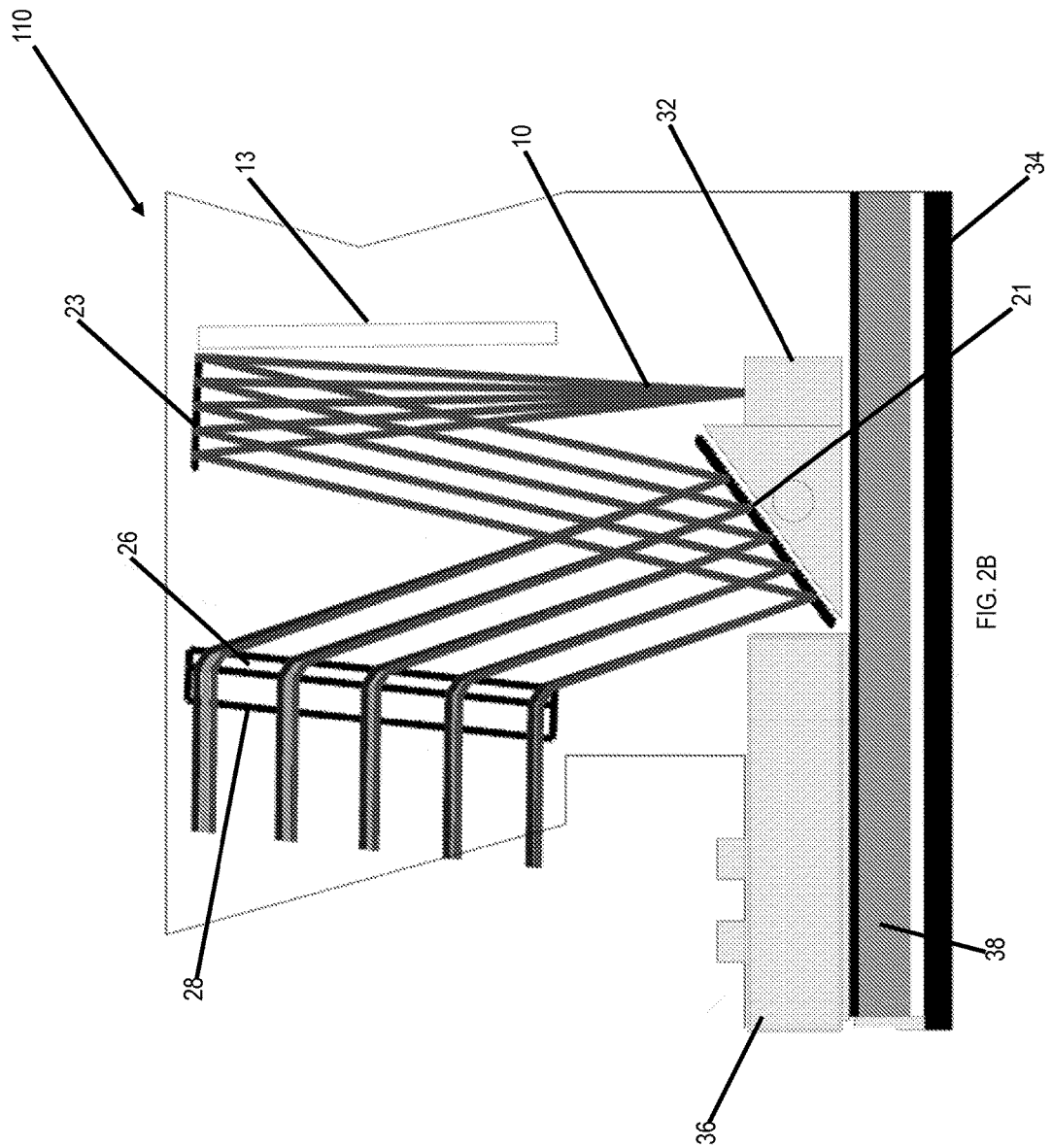

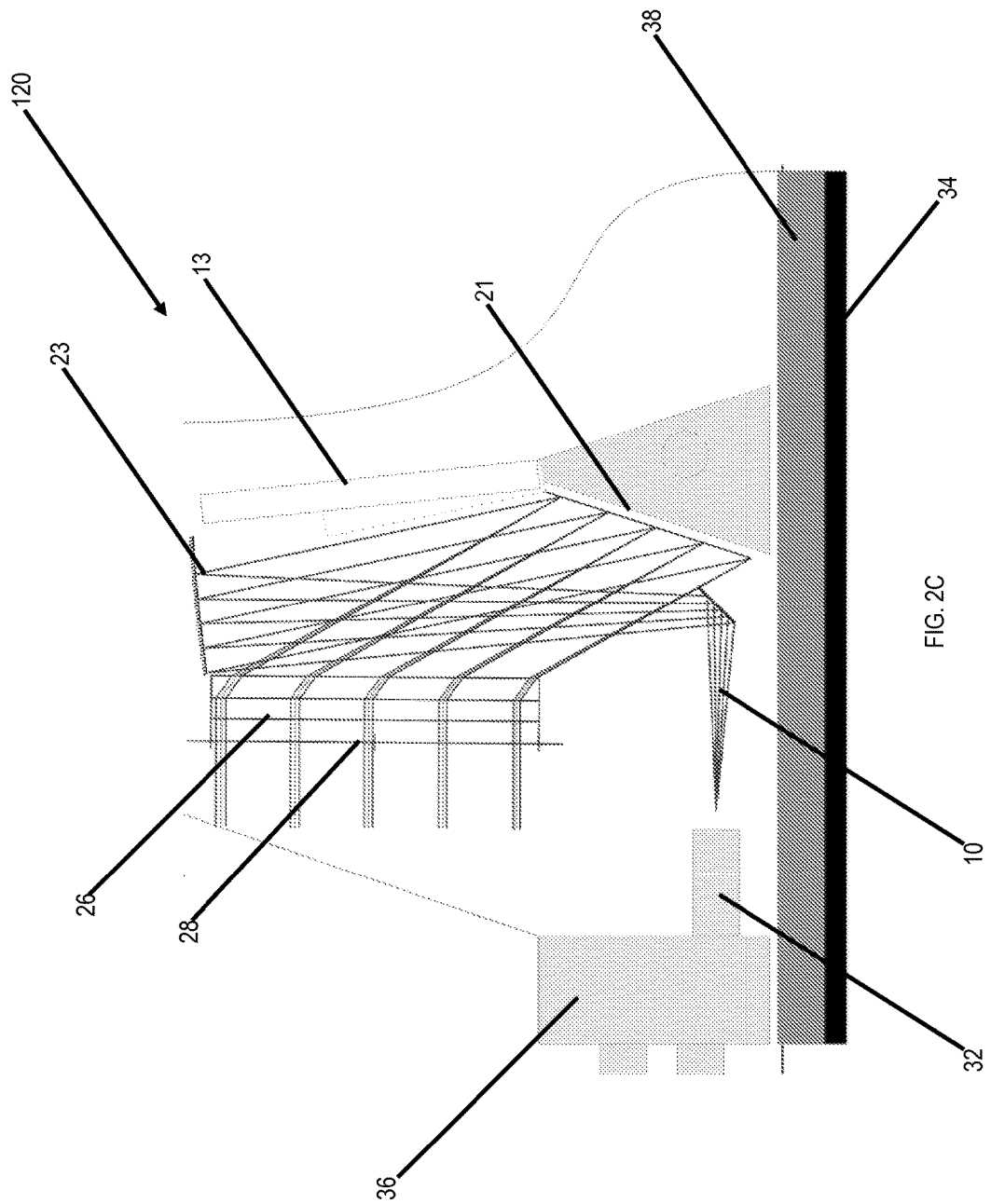

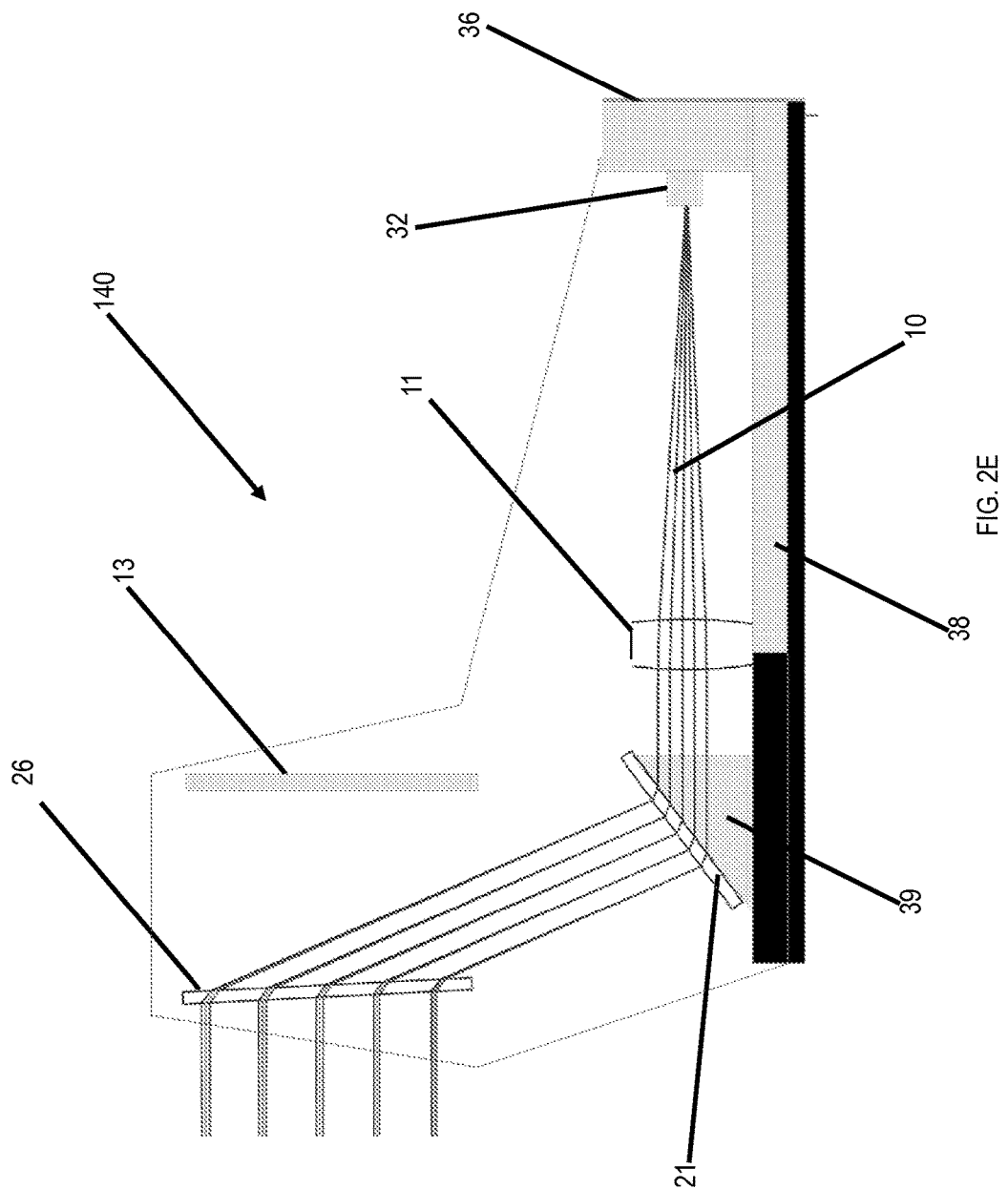

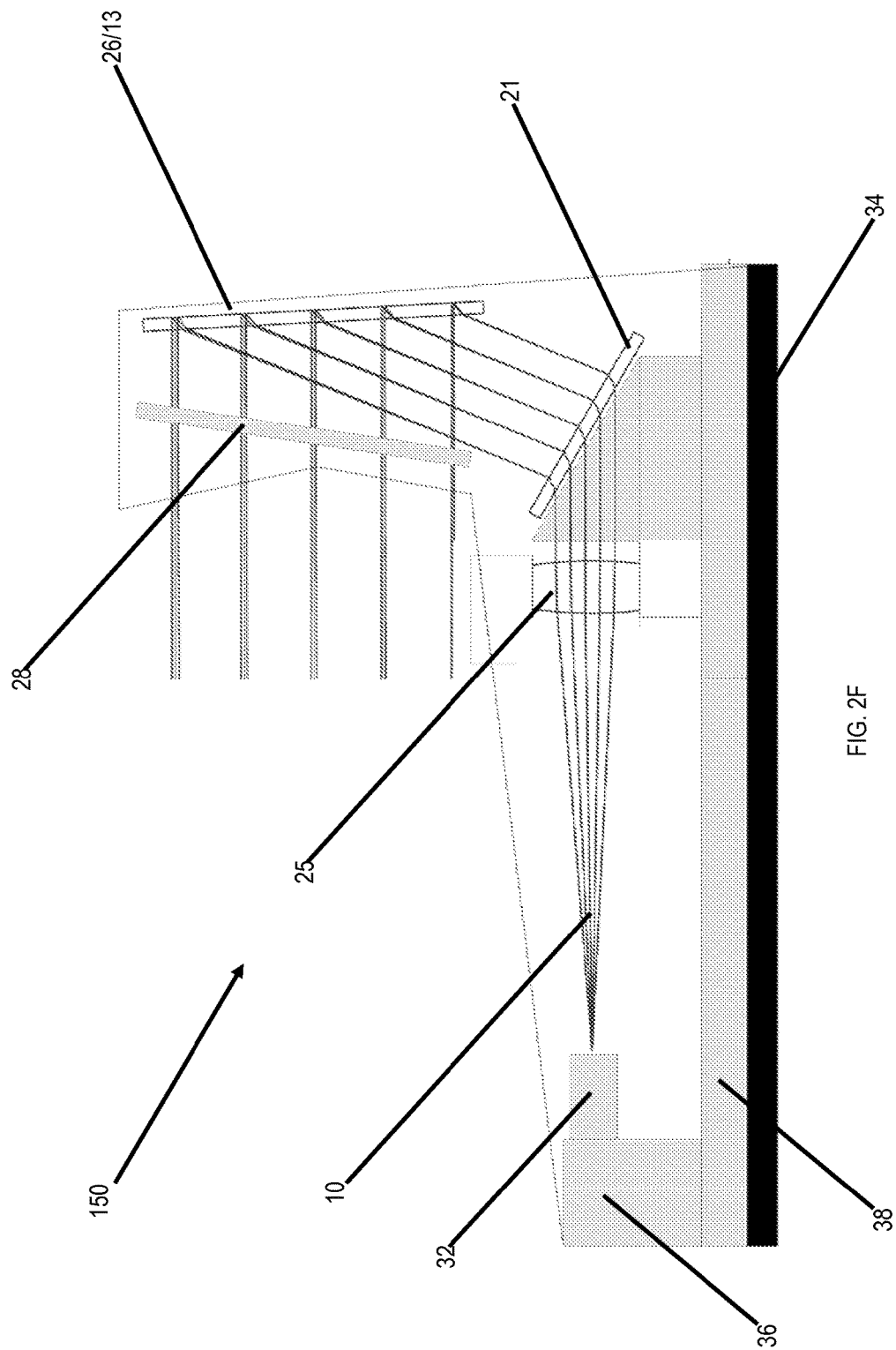

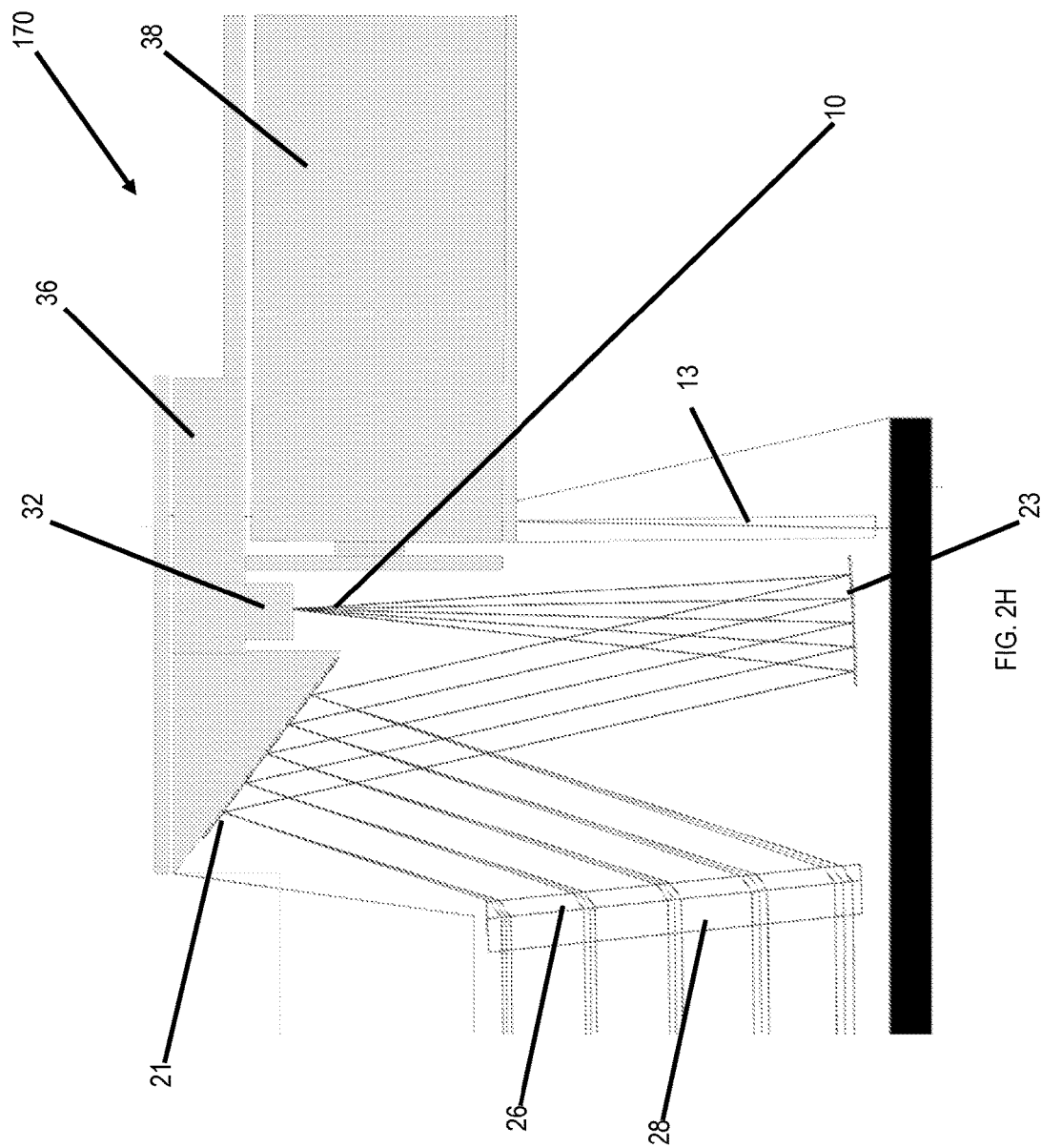

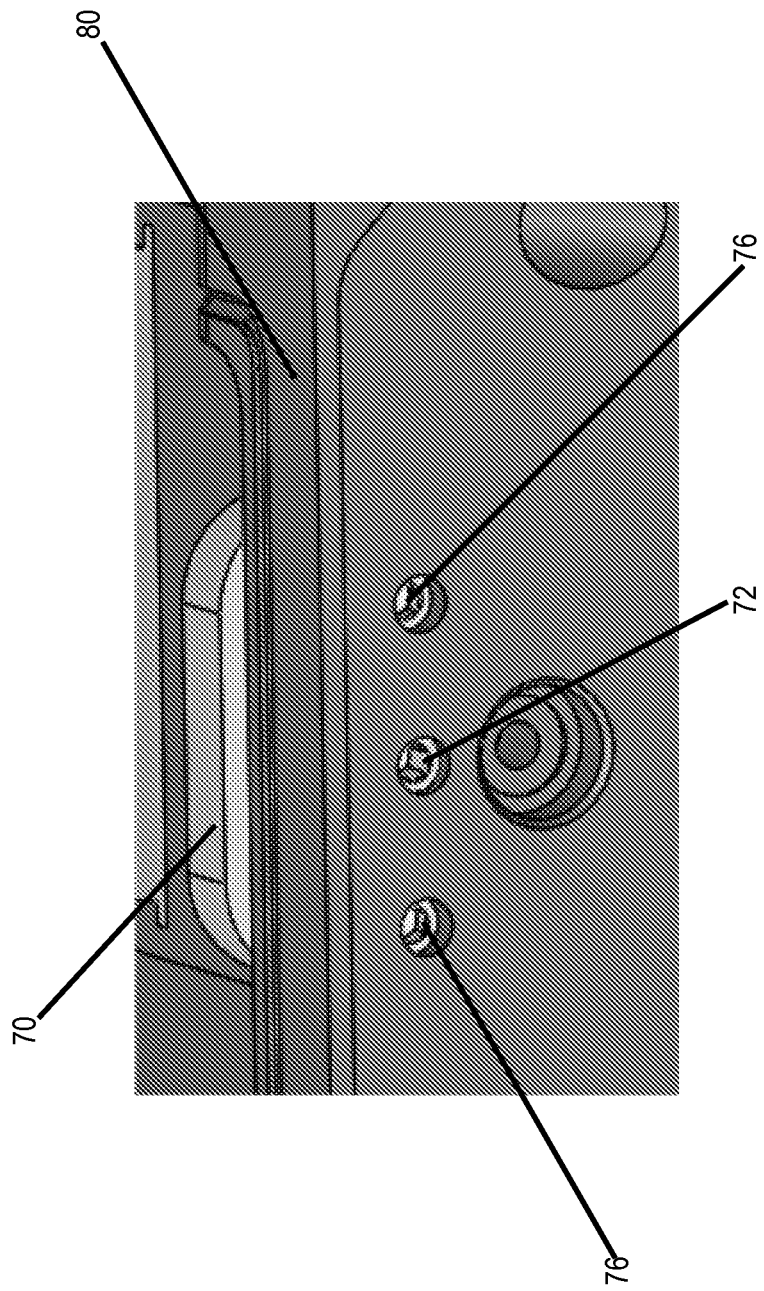

MODULAR HOLOGRAPHIC SIGHTING SYSTEM

RELATED APPLICATIONS

This application claims priority benefit of U.S. Provisional Application Ser. No. 61/844,254 filed Jul. 9, 2013; the contents of which are hereby incorporated by reference.

FIELD OF THE INVENTION

The present invention in general relates to holographic sighting devices and in particular, to a holographic sighting system that is lightweight, waterproof, and modular and can be used on small firearms, bows, telescopes, and other applications where aiming is necessary.

BACKGROUND OF THE INVENTION

Multiple sighting methods for aiming firearms have been utilized for both commercial and military applications. The most basic, the iron sight, requires the shooter to align the rear sight, front sight, and the target while switching the eye's point of focus between the rear and front sight pattern and the target. The iron sight method, while reliable, can be difficult to learn and has multiple drawbacks including the rear and front sight obstructing the view of the target and complications arising from sub-optimal lighting conditions. Telescopic sights, while accurate, are not suited for situations where the target is moving, close quarter conditions, or if the shooter is mobile. Laser designator sights, where a laser beam illuminates the target can be difficult to use in certain lighting conditions and are unacceptable for military or self-defense applications where the shooters location must not be revealed. Red dot sighting systems—Reflex-, such as those provided by AimPoint® solve many of the above difficulties, but are only able to project a single dot reticle pattern due to off-axis aberrations.

Holographic sighting systems, such as described in U.S. Pat. No. 6,490,060 issued to Tai et al., have become the preferred solution for shooters requiring a high degree of accuracy with fast target acquisition. Specifically, the Holographic Weapon Sight (HWS) manufactured by L3-Communications EOTech, Inc. was the first system to make use of holographic technology in order to project a full reticle pattern at or near the target plane creating a low parallax sighting solution that can be deployed quickly and in any lighting condition. EOTech holographic weapon sight (HWS) systems were also the first to make use of wavelength dispersion matching technology that allow laser diode illumination to be used over extended temperature ranges.

However, currently available HWS systems suffer from drawbacks related to their design and technique of manufacturing. Current HWS products utilize an internal mechanism to adjust reticle position, which alters the achromatic geometry of the system when aiming adjustments are made, thereby compromising the ability of the wavelength dispersion compensation elements to perform as intended. The result is that these sighting systems will perform differently when used in temperatures other than that of which they were initially aligned. In addition to compromised wavelength dispersion matching, current HWS products also suffer from reticule pattern distortion as a result of the mechanical stresses created from the internal adjustment mechanism. The wavelength stabilizing holographic optical element is bonded to a plastic flexible element, creating a system that is susceptible to wave front aberrations brought about by changes in temperature to the hologram and mounting substrate. The resulting distortions can be observed as a "smudging" or increase in size of the dot element used for aiming. In addition, current HWS products use a standard o-ring and compressed flat rubber gasket system to isolate the holographic optical components from the outside environment. The effectiveness and reliability of an o-ring and compressed flat rubber gasket sealed HWS system is highly dependent on the repeatability of the manufacturing process. Any variability induced by workmanship and manufacturing methods affects the integrity and effectiveness of the seal over time. The flat rubber and o-ring sealing system is often compromised by the stresses caused from changing ambient temperature and pressure conditions, resulting in continued cycling of the housing cavity pressure, which tends to make the flat gasket method of sealing failure prone. As a consequence, systems sealed in this manner tend to leak, allowing moisture to permeate the holographic elements resulting in fading of the reticule image.

As a result, the current HWS systems require higher intensities of laser diode power in order to maintain a desired reticule brightness and have average battery life spans far less than competing red-dot products.

Most current HWS products use an off axis reflection collimating element to prepare the light incident on the first holographic element. These reflection collimating elements require the precision removal of an off center section from a lens to be coated with a reflective element prior to their use in the HWS. However, inconsistencies in the production of this off center section introduce aberrations and increases production costs.

Finally, current designs for HWS systems lack modularity, and minor changes to mounting systems, optical path, reticle patterns, and battery type require a complete re-design and re-tooling in order to implement the changes.

Thus, there exists a need for a modular lightweight holographic sighting system that is stable over a wide temperature range, maintains a battery life that is comparable to competing red-dot products, has a large, high aspect viewing window, occupies the minimum amount of rail space on a hand held weapon, and can be produced inexpensively and accurately in high volume.

SUMMARY OF THE INVENTION

A holographic sighting system is provided that includes an upper housing assembly enclosing a holographic optical element, an anti-reflective glass viewing window, a battery, and a laser diode light source driven by a microcontroller circuit configured to minimize the laser diode's current draw to maximize the battery life; and a lower housing assembly enclosing two dielectric folding mirrors, an on-axis collimating lens, and a high efficiency achromatizing holographic optical element. The holographic sighting system is mountable on at least one of; hand gun, rifle, crossbow or bow. The laser diode light source is a red diode laser light. In a specific embodiment the anti-reflective glass viewing window measures 1.4×1 inches (3.56×2.54 cm).

The holographic sighting system has entirely fixed on-axis optical and holographic elements thereby providing the least amount of optical aberration over a wide temperature range. The system further includes fine grain holographic silver halide plates to improve diffraction efficiency and image resolution.

The lower housing assembly of the holographic sighting system includes a modular base system that provides both vertical and horizontal aiming for the sighting system and eliminates the need for relative motion between optical elements. The modular base system is configured for attaching various sizes of the sighting system to a firearm while providing accurate windage and elevation adjustments.

The holographic sighting system also includes a laser diode carrier for mounting the laser diode light, the laser diode carrier being attached to a flexible circuit that allows the laser diode to be adjusted via a set of alignment controllers connected between the lower housing assembly and to the laser diode carrier. The set of alignment controllers further include tensioning springs that provide an outward bias to the laser diode carrier that opposes the tightening action of the set of alignment controllers and eliminate hysteresis during focusing The Sight Body is sealed to the Optical Carrier by an injected elastomer after mechanical fixing of the two assembled components to provide a non-stressed seal that is not subject to the vagaries of assembly processes and withstands a wide range of temperature and pressure conditions while maintaining seal integrity.

BRIEF DESCRIPTION OF THE DRAWINGS

The present invention is further detailed with respect to the following drawings that are intended to show certain aspects of the present invention, but should not be construed as a limit on the practice of the present invention.

FIGS. 2A-2H are a series of cross-sectional views of various embodiments of the inventive holographic sighting system with various optical configurations for varying sized housing and power configurations;

FIGS. 4A-4D are a series of perspective views of the laser diode carrier and adjustment screws that allow for focusing the laser diode according to embodiments of the invention.

DETAILED DESCRIPTION OF THE INVENTION

Figure 1A:
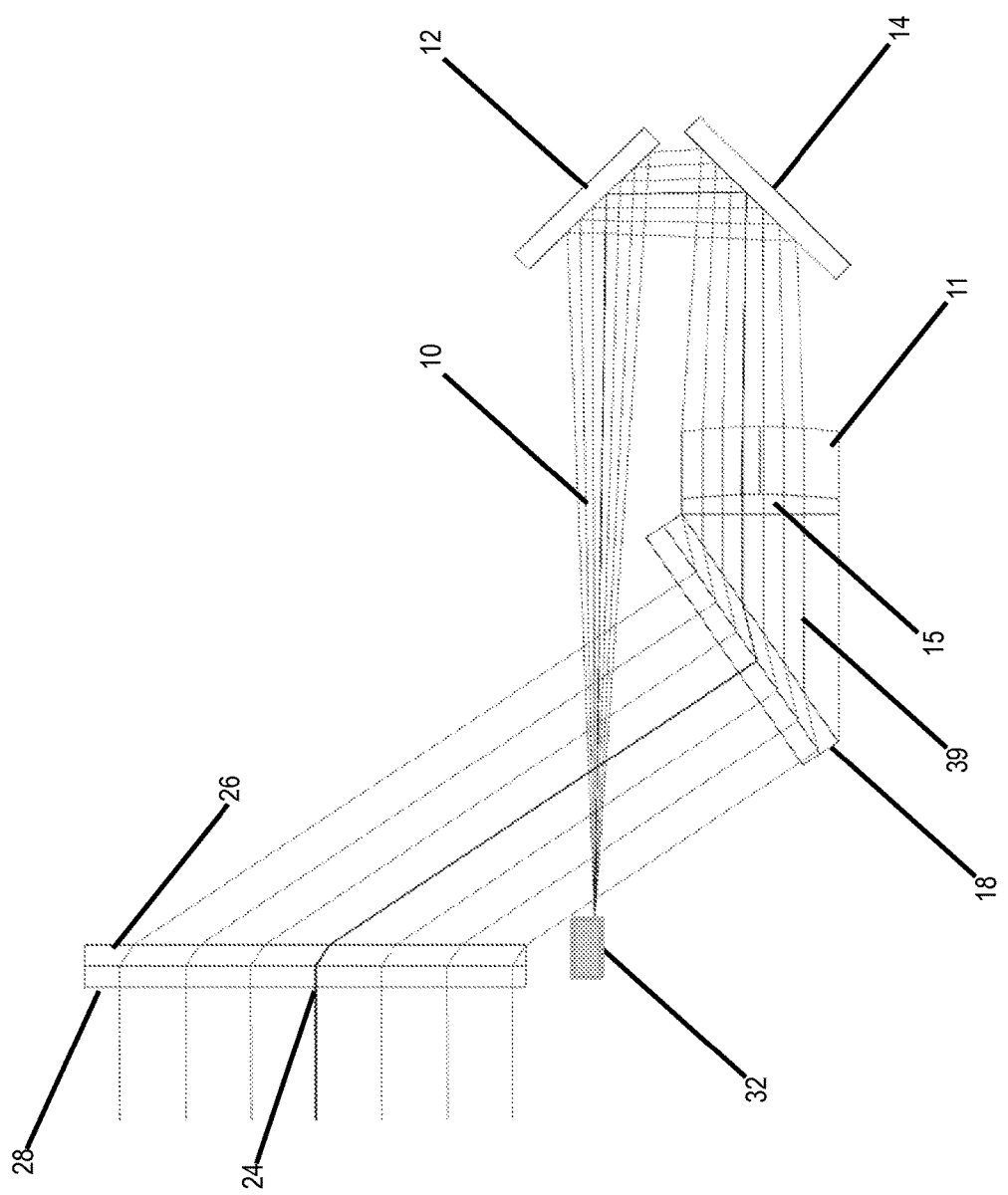
FIGS. 1A and 1B illustrate the basic optical paths of the holographic sighting system according to embodiments of the invention.

The present invention has utility as a lightweight holographic sighting system specifically designed to minimize optical aberrations common with earlier holographic sighting systems with a modular construction that is more economic and conducive to high volume production, in terms of complexity of required fixturing and availability of materials, than earlier systems. Embodiments of the invention provide a holographic sighting system that is lighter and more compact (shorter in length), while providing a larger field of view than existing systems that can be used on small hand guns, standard size firearms, bows, telescopes, and other devices without adding significant weight or space constraints. Embodiments of the inventive sighting system utilize an upper housing assembly containing a high efficiency holographic optical element, an anti-reflective glass viewing window, and a red diode laser light source driven by a high efficiency microcontroller circuit designed for increased battery life, and a lower housing assembly containing two dielectric folding mirrors, an on-axis collimating lens, and a high efficiency achromatizing holographic optical element. The inventive sighting system provides a larger viewing window than previous designs. In a specific inventive embodiment, a high aspect ratio holographic image covered with an anti-reflective glass viewing window. In another specific inventive embodiment, a viewing window that measure 1.4×1 inches (3.56×2.54 cm) is provided.

The inventive modular base system connects multiple sighting systems to a firearm while providing accurate windage and elevation adjustments. In embodiments of the inventive sighting system, a modular base system provides both vertical and horizontal aiming for the sighting system eliminating the need for relative motion between optical components that leads to aberrations found in previous designs. The inventive holographic sighting system has entirely fixed on-axis optical and holographic elements thereby providing the least amount of optical aberration over a wide temperature range thereby maintaining a 1 moa dot at the center of the reticle pattern. Embodiments of the inventive holographic sighting system utilize fine grain holographic plates in order to realize the highest possible diffraction efficiency and image resolution.

Alternative power supply options are provided in embodiments of the invention including rechargeable batteries for reducing weight and volume. For example, rechargeable lithium ion type batteries used in portable electronic devices like cell phones, as well as conventional cell type batteries, such as button lithium cells, and double A size, that are used for availability and ease of replacement may be used in embodiments of the inventive sighting system. The inventive sighting system can be easily altered to accommodate multiple battery types. Embodiments of the inventive holographic sighting system obtain best in class battery life (as compared to current HWS systems on the market) by means of high efficiency optical components and electronics design.

In the inventive sighting system, the housing is sealed by various methods; first of these methods is with a channeled elastomer seal that provides a non-stressed and fully encapsulated seal channel to protect the internal elements from the external atmosphere.

Figure 1B:
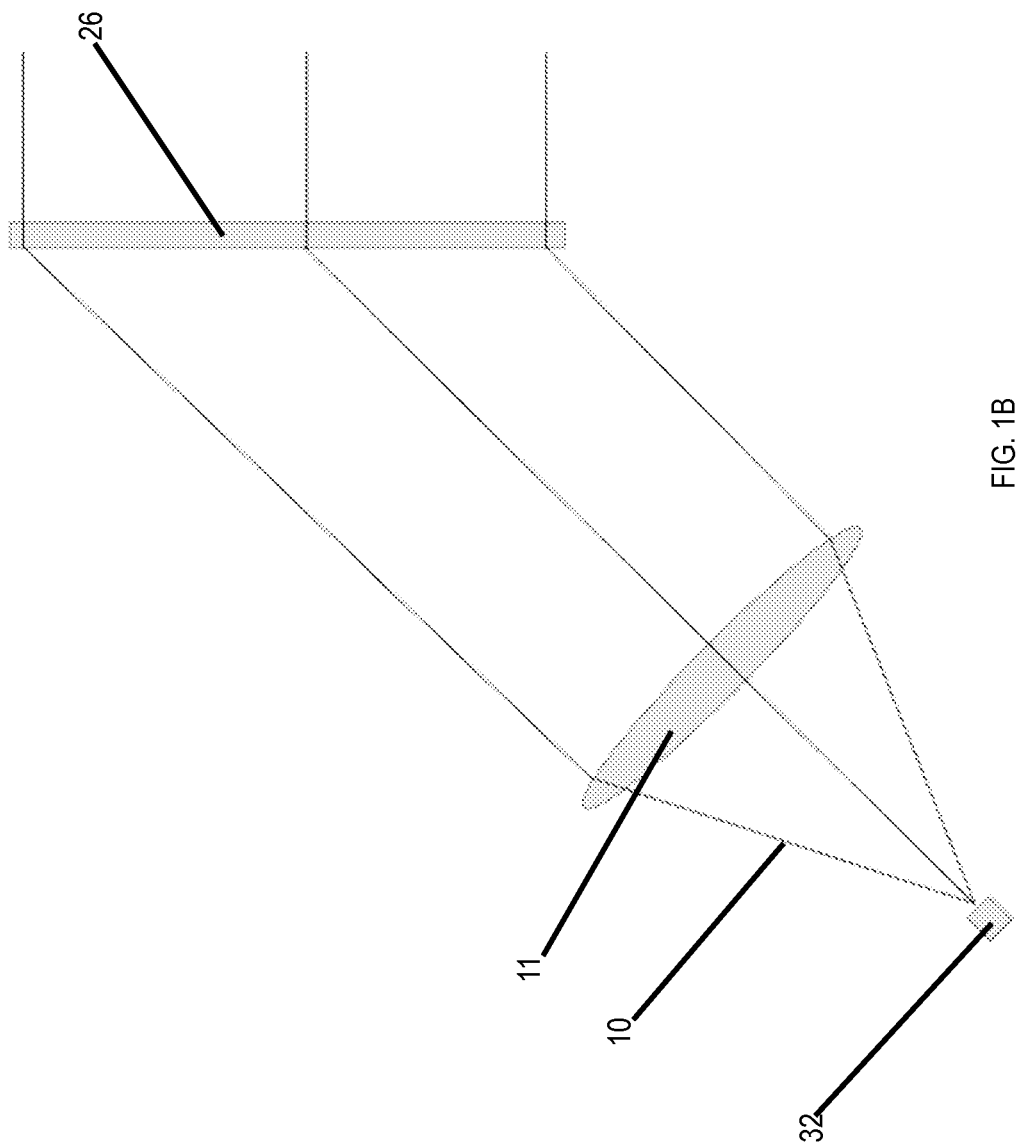
Figure 2A:
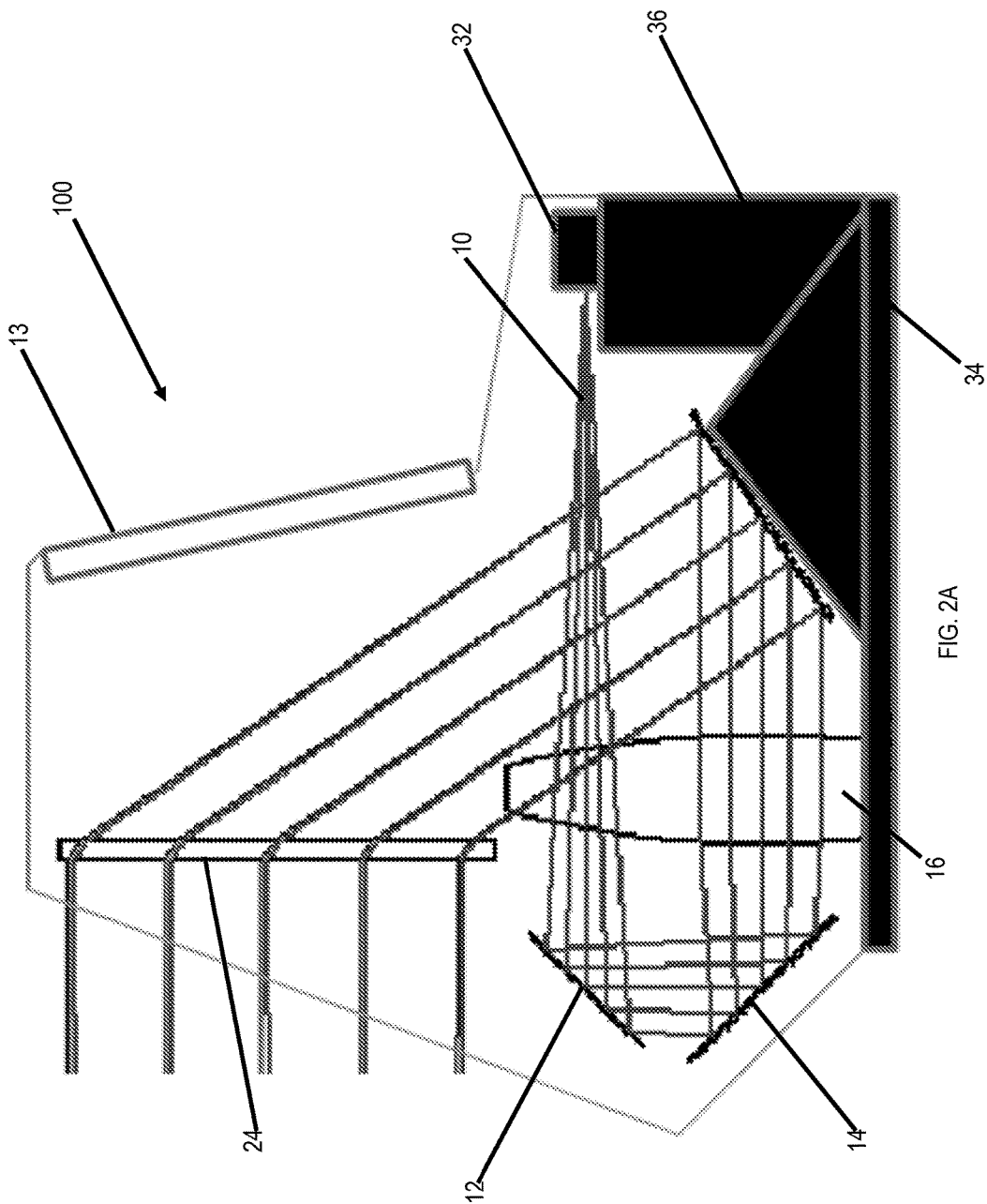
Figure 2D:
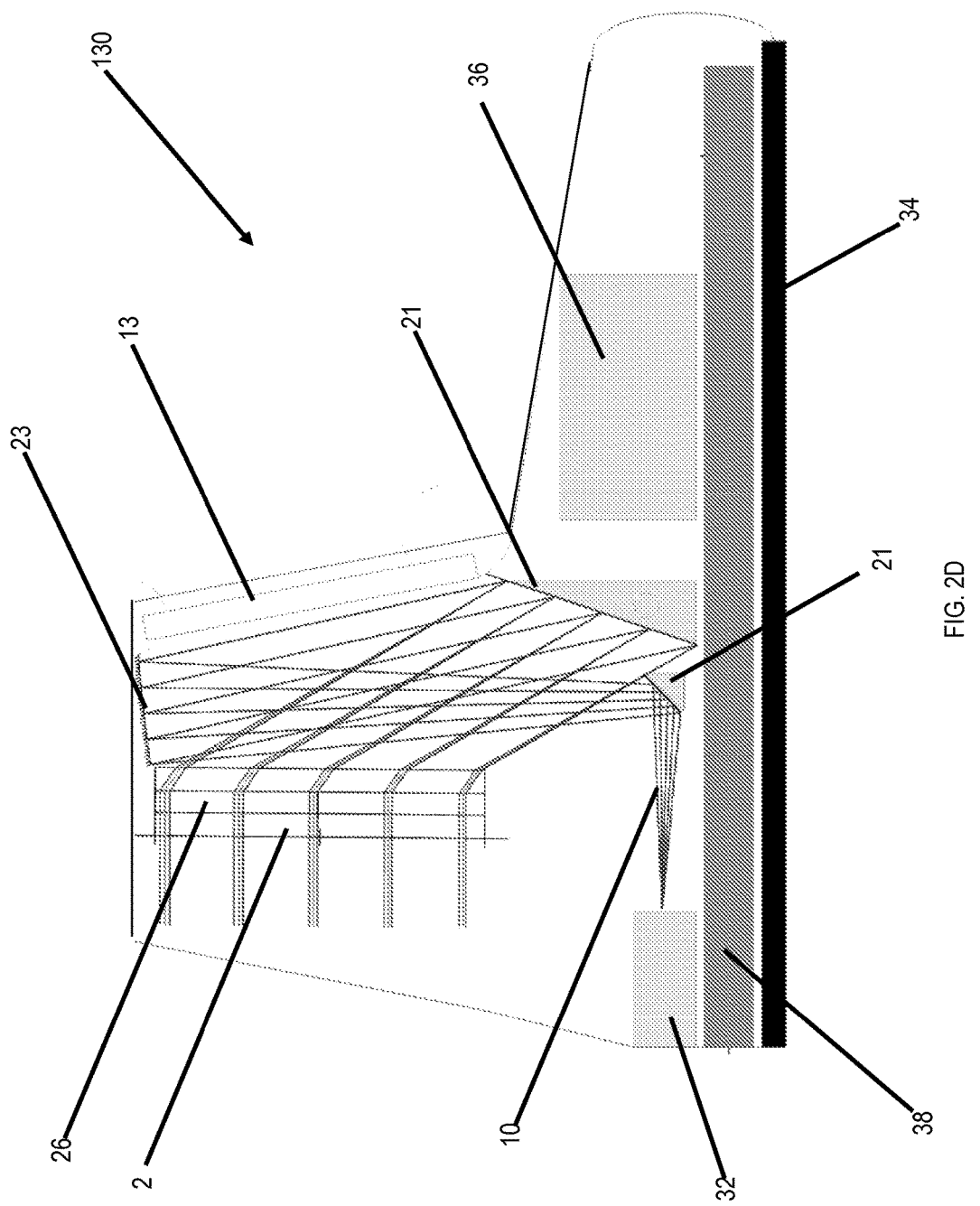
Figure 2G:
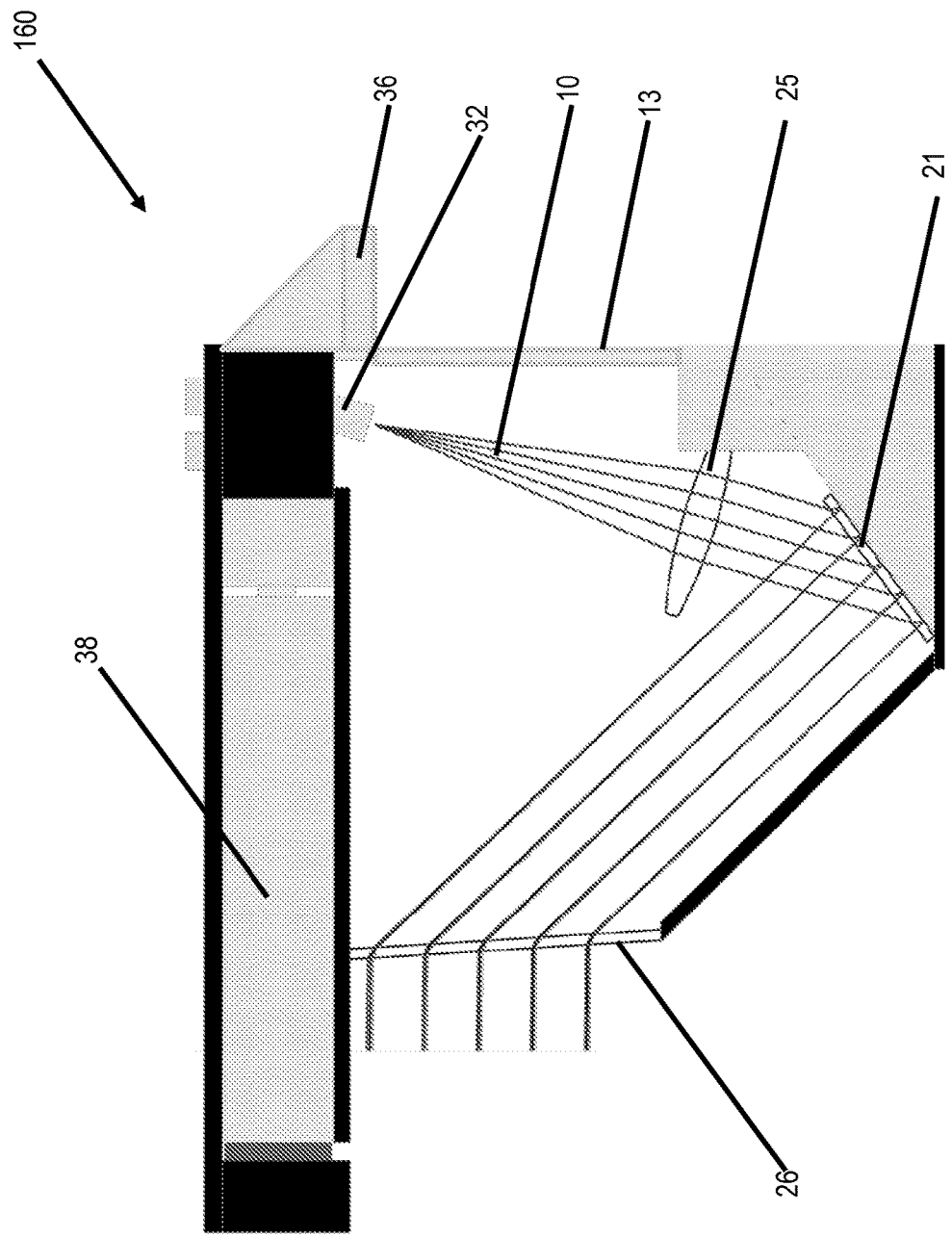

Referring now to the figures, and in particular FIGS. 1A and 1B in which like numerals are attributed to common elements between figures, embodiments of the inventive sighting system introduce a collimated laser light to a holographic wavelength compensation element over a surface area large enough to accommodate larger viewing windows 24, such as the 1.4 by 1 inch (3.56×2.54 cm) viewing window mentioned above as shown in FIG. 1A. This is accomplished by turning the laser beam 10 emitted by a laser diode module 32 twice through a distance of approximately 70 mm before being collimated by an aspheric surface. In embodiments of the inventive sight, a laser diode 32 with a full width at half maximum (FWHM) energy density of 30° by 10° will cover a surface area of approximately 35 mm by 12 mm. In the preferred version of the invention the folding surfaces or mirrors (12, 14) are coated dielectrically to reflect the maximum energy at a wavelength of 650 nm at an a angle of 45 degrees. To reduce weight and space, a section is cut from a collimating surface in some inventive embodiments.

The collimated laser light 15 is incident on a "PRISM" 39 then holographic transmission grating 18. The diffracted light is then incident on the image hologram 26 and diffracted by the same amount. Because the dispersion of the two holograms are equal with opposite signs, there is no resulting deflection of the twice diffracted beam with changes in laser wavelength due to temperature.

FIG. 1B is an embodiment of how simplified a holographic sighting system would become when temperature stable TO can laser diodes 32 are used. In this configuration, light 10 from the laser diode 32 is collimated by a lens 11 or a reflective element and passes through a holographic image 26 with no resulting aberrations due to temperature change.

Optical lead lines and related elements for various embodiments of the present invention are provided with respect to FIGS. 2A-2H in which like reference numeral between depictions are intended to have like meanings Separate sights are shown generally at 100, 110, 120, 130, 140, 150, 160, and 170 in FIGS. 2A-2H, respectively. A laser diode 32 emits a beam 10 that interacts with at least one lens element 16 and at least one mirror with a first mirror 12 and a second mirror 14 illustrated. It is appreciated that the type of lens elements, number or lens elements, orientation of lens elements, number of mirrors, and orientation of mirrors are all variables that are readily modified without departing from the present invention. A cover plate 28 serves to protect the optics from environmental exposure via the viewing window. The holographic image 26 is visible on a holographic plate positioned proximal to the cover plate 28. The holographic image 26 or other indicia is visible against a projection against a sighting field down range of the inventive sight as observed through transparent sighting window 13. In some inventive embodiments, an adjustable base 34 is present to adjust the relative position of the aforementioned optical elements. A power source 38 is provided to energize the laser diode 32 and electronics 36 associated with the present invention.

The inventive sight 110 of FIG. 2B is also depicted include a holographic grating 21 and a reflecting collimator 23. A particular compact optical path and overall volume of sight 120 is noted compared to conventional holographic sights.

Figure 3:
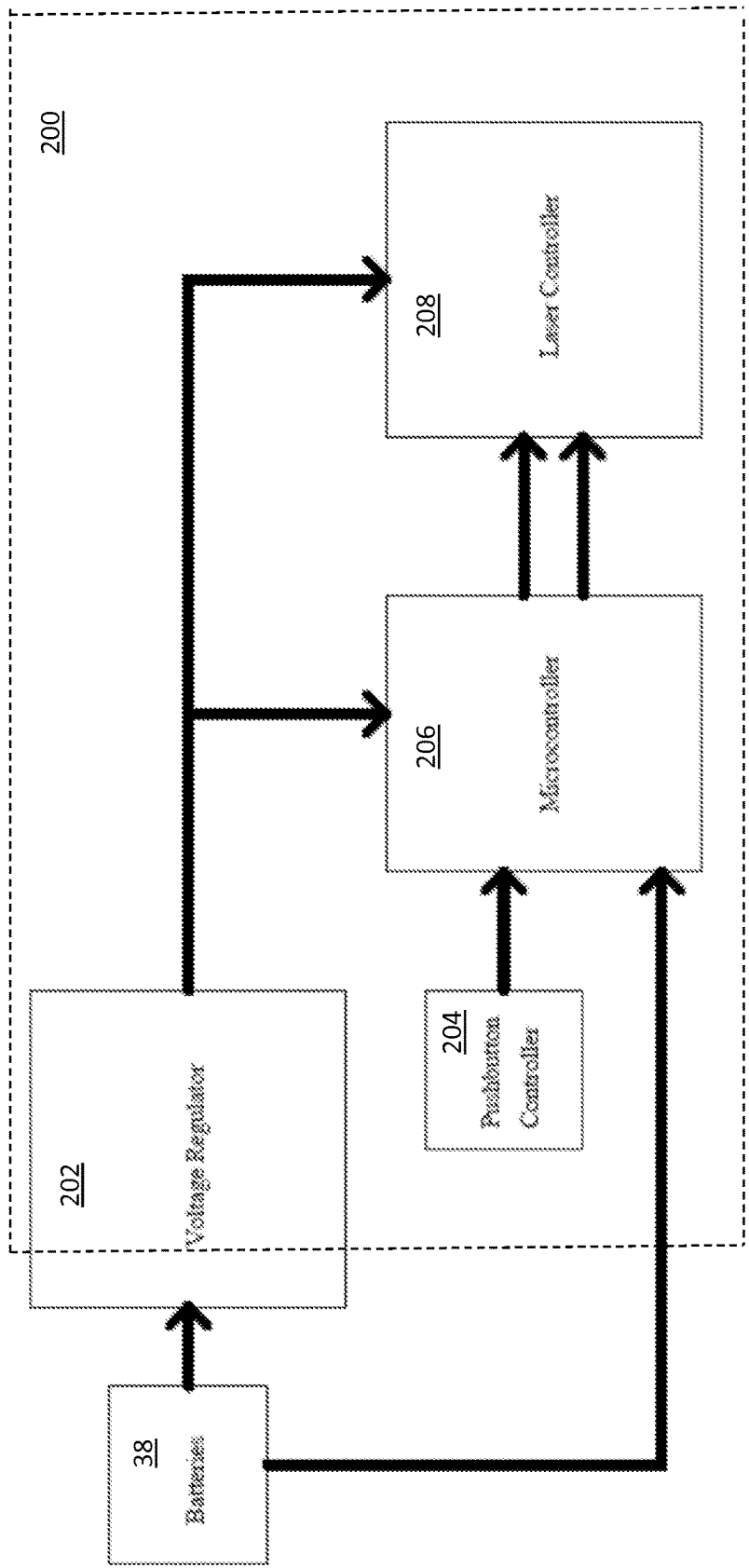
FIG. 3 is a schematic diagram of the electronics assembly for use in the holographic sighting system according to embodiments of the invention.

FIG. 3 is a schematic diagram 200 for an embodiment of an inventive holographic sighting system which provides additional detail to the electronics subsystem 36 as shown in the embodiments of FIGS. 2A-2H. The operational schematic 200 can be subdivided into three major operational blocks. The first operational block represents power management via voltage regulator 202, and how all the circuits are powered. The second operational block is the microcontroller 206 and how the microcontroller is used to interface to external components. The third operational component is the control and settings of the laser diode 32 via laser controller 208. Each of these sub-circuits is explained in detail below.

Powering embodiments of the inventive holographic sighting system is achieved through the use of a power source such as a battery or ultracapacitor. Power sources operative herein illustratively include battery formats of AAA, AA and button-type batteries; of various chemistries illustratively including alkaline, lithium, and various rechargeable batteries, each alone or with multiple batteries stacked in series. The battery power source 38 configuration provides a voltage which is then in turn used to power a switching voltage regulator 202. The voltage regulator 202 regulates the voltage to a required level for powering the microcontroller 206 as well as biasing the laser diode 32. The efficiency of the switching voltage regulator 202 contributes to minimizing the current consumption of the system design of the inventive holographic sighting system. It is noted that emphasis is placed on using a low series resistance capacitor on the output of the regulator 202 which powers the rest of the electronics board 36.

In certain embodiments of the inventive holographic sighting system, the voltage created from the switching voltage regulator 202, is supplied to an extremely low-power 8-bit microcontroller 206 that is used for a variety of tasks. Once the inventive holographic sighting system is powered, the microcontroller 206 puts itself into a low-power state where only an external interrupt from the ON/Increase button found on the pushbutton controller 204 is capable of waking the microcontroller 206 up. The next state upon waking up the microcontroller 206 is to check the battery voltage powering the voltage regulator 202, and comparing the battery voltage to an internally generated voltage by the use of a comparator. If the battery voltage reads below an operating threshold, the microcontroller 206 flashes the laser diode 32 indicating a low-battery and then the microcontroller 206 proceeds to put itself back into a deep sleep.

Upon a successful wake-up, the microcontroller 206 is then used to generate a pulse-width modulated (PWM) signal used to set the current level of the laser diode 32, as well as a modulation signal used to pulse the laser light 10 at a higher frequency thus saving power from the high current consumption of the laser diode 32. The high frequency modulation signals takes advantage of the fact that the laser diode 32 is slower in nature to reacting to fast changes which is commonly seen in fiber optic digital communications. The modulation frequency is set by an internal timer or an output of a system clock both generated by the microcontroller 206.

While in an operating state, the microcontroller 206 also handles interrupts created by the push-buttons on the pushbutton controller 204 which serves as an interface to a user of the inventive holographic sighting system. With the pushbutton controller 206, the user can turn on the holographic sighting system, increase optical intensity, decrease optical intensity, and turn off the system.

The third operational component or subsystem of the electronics 36 is the control and settings of the laser diode 32 via laser controller 208. In a specific embodiment, control of the laser diode 32 is accomplished through a pure analog design PWM and PFM techniques. From the microcontroller 206, the PWM signal is first put through a first order RC-filter (resistor capacitor filter). Doing this allows an average voltage to be fed into an op-amp configured as an integrator which is used to smooth out any abrupt variations that may occur from the modulation portion of the laser diode control 208. Optical feedback is provided back into the inverting leg of the op-amp, which allows the laser diode 32 to monitor itself and prevent the current consumption to get out of control and damage the laser diode 32. The feedback also helps to compensate for the small variations that may occur between laser diodes 32, as well as temperature changes when operating the inventive holographic sight. The optical feedback is obtained from a photodiode's current generation that is scaled appropriately by a resistor connecting the photodiode to ground. In essence, any current through the resistor creates a voltage according to Ohm's law and this is the voltage fed back into the op-amp. Careful selection of an op-amp with small input offset is also emphasized to minimize any inherited offset being that the voltage generated by the photodiode is extremely small and sensitive. The op-amp's output is then fed into a bipolar junction transistor (BJT) which allows small voltages to translate into a small current being passed from the collector to emitter, and achieves a very low current consumption of the holographic sight since the dominating factor for this calculation comes from the intrinsic nature of the laser diode 32.

Finally, the laser controller 208 is able to achieve higher optical powers, and yet not be penalized by the current consumption of the laser diode 32 through the use of a modulation circuit that controls a MOSFET transistor that modulates a path to ground of the laser diode 32. Being that the response time of the laser diode 32 is far slower than the frequencies used to modulate the laser diode 32, a large resistor to ground is used to hold the laser 10 just below optical lasing. This gives the laser diode 32 a 'running start' whereas driving the laser diode 32 from a completely grounded signal taxes the system because of the current consumption needed for such a fast response. By using a 'logic-level' MOSFET, the MOSFET can be directly interfaced to the microcontroller 206 where only a voltage threshold is needed to trigger the MOSFET from an off to an on state.

Figure 4A:
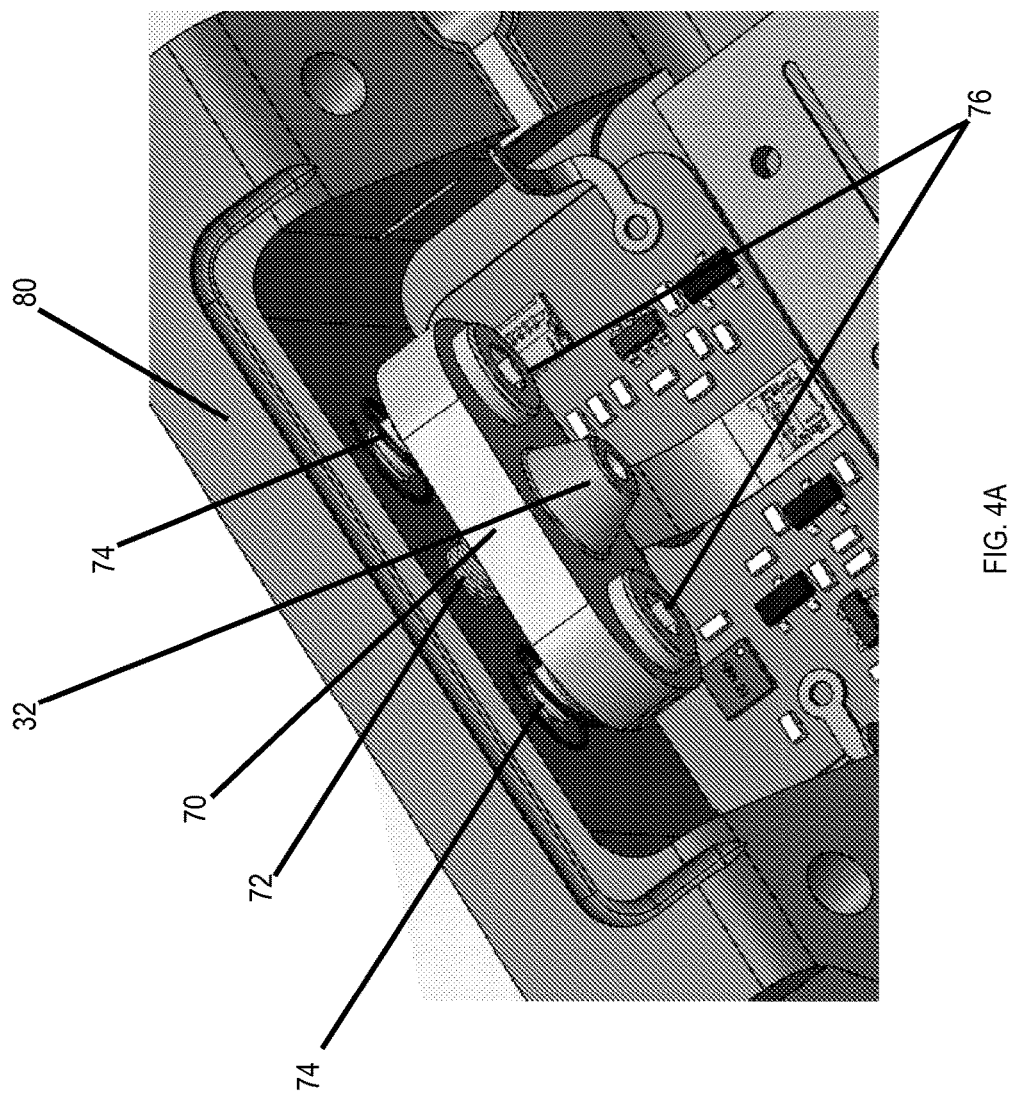
Figure 4C:
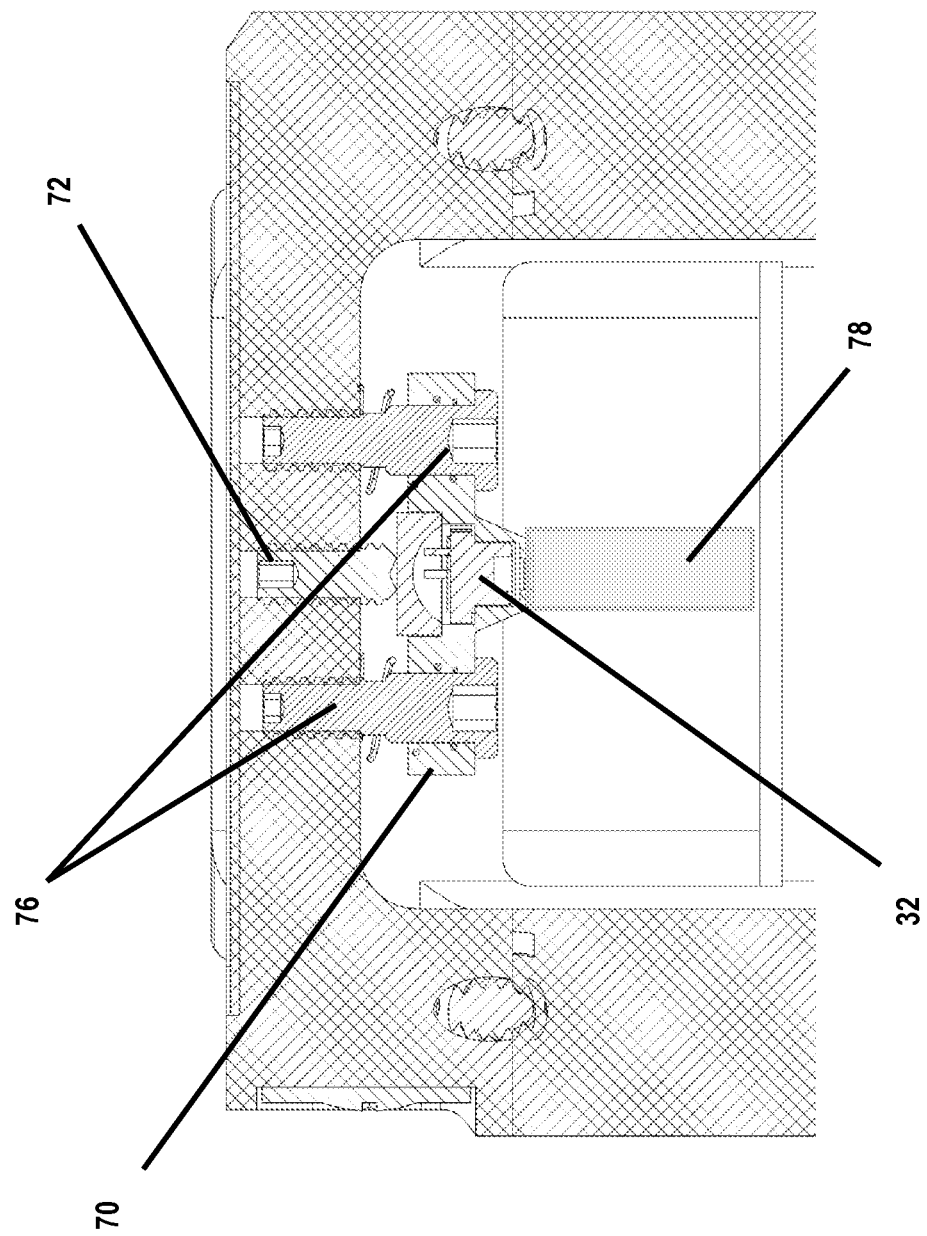

FIGS. 4A-4C are a series of perspective views of the laser diode carrier 70 and adjustment controllers 76 or screws that allow for manual focus of the laser diode 32 according to embodiments of the invention. As most clearly shown in FIGS. 4A and 4C, the laser diode 32 is mounted to a laser diode carrier 70 with the laser diode carrier 70 attached to a flexible circuit 78 that allows the laser diode 32 to be adjusted via the alignment controllers 76. The alignment controllers 76 attach the laser diode carrier 70 to the lower body component 80 of embodiments of the inventive holographic sighting system. The laser diode carrier 70 is spring loaded by tensioning springs 74 to eliminate hysteresis during focusing, which is performed on a focusing fixture (not shown). The tensioning springs 74 provide an outward bias to the laser diode carrier 70 that opposes the tightening action of the alignment controllers 76. As shown in FIG. 4C, which is a top down cross-sectioned view of the laser diode carrier 70 of FIG. 4A, that shows the relationship between the alignment controllers 76 and the laser diode carrier 70. As shown in FIG. 4B, the laser diode 32 focus may be adjusted externally from the lower body component 80 with an alignment tool such as a hex head screwdriver, or other type of screwdriver or tool that can be inserted or engage into the alignment controllers. In operation, a user adjusts the laser diode carrier 70 focus orientation via the alignment controllers 76, and when a desired or correct focus is achieved the locking screw 72 is tightened, thereby fixing the laser diode carrier 70 and therefore the laser diode 32 in the focused position.

Figure 4D:
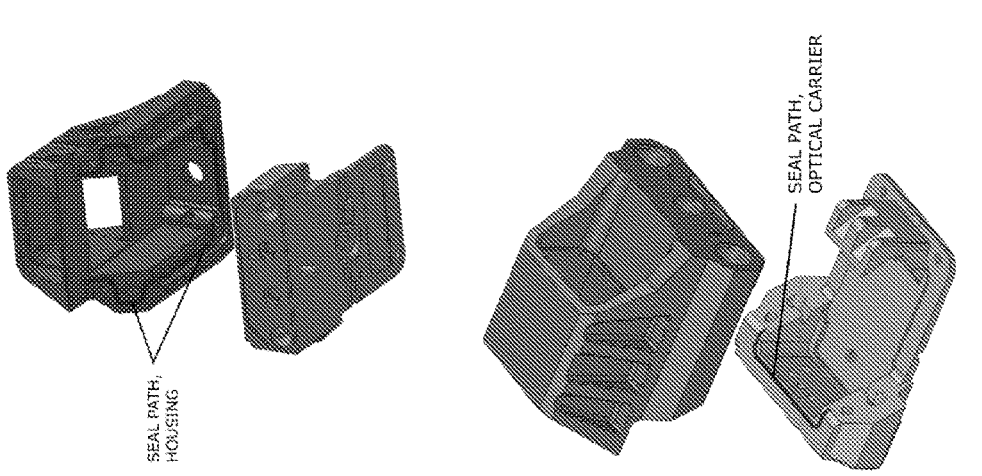

The optical cavity seal is a closed cavity channel that provides a non-stressed seal that is applied to the assembled housing components after all settings and adjustments are completed. It is a consistent and reliable seal that is not subject to the vagaries of an assembly process. FIG. 4D.

The foregoing description is illustrative of particular embodiments of the invention, but is not meant to be a limitation upon the practice thereof. The following claims, including all equivalents thereof, are intended to define the scope of the invention.

The invention claimed is:

1. A holographic sighting system comprising:
   an upper housing assembly enclosing an image hologram, the image hologram being a reticle pattern, an anti-reflective glass viewing window, a battery, and a laser diode light source driven by a microcontroller circuit configured to minimize said laser diode's current draw to maximize said battery life, the laser diode light source emitting a laser beam;
   a lower housing assembly enclosing two dielectric folding mirrors, the upper housing assembly being movable relative to the lower housing assembly, the plane of the first dielectric folding mirror being non-parallel to the plane of the second dielectric folding mirror, an on-axis aspheric collimating lens, and an achromatizing holographic transmission grating with fine grain holographic silver halide plates that form two emulsion holograms to improve diffraction efficiency and image resolution;
   a prism;
   wherein the holographic sighting system is configured such that the laser beam emitted by the laser diode light source is turned by the first dielectric folding mirror and again by the second dielectric folding mirror in an opposite direction of travel than the emitted beam from the laser diode light source, the turned beam being collimated by the collimating lens, the collimated beam being incident on the prism and the holographic transmission grating, the diffracted beam being incident on the image hologram and being diffracted by the same amount.

2. The system of claim 1 wherein said holographic sighting system is mountable on at least one of small hand guns, standard size firearms, bows, or telescopes.

3. The system of claim 1 wherein said laser diode light source is a red diode laser light.

4. The system of claim 1 wherein said anti-reflective glass viewing window measures 3.56×2.54 cm.

5. The system of claim 1 wherein said holographic sighting system has entirely fixed on-axis optical and holographic elements thereby providing the least amount of optical aberration over a wide temperature range.

6. The system of claim 1 wherein said sighting system further comprises a voltage regulator, a microcontroller, and a laser controller.

7. The system claim 1 wherein said lower housing assembly further comprises a modular base system that provides both vertical and horizontal aiming for the sighting system and eliminates the need for relative motion between optical elements.

8. The system of claim 7 wherein said modular base system is configured for attaching various sizes of said sighting systems to a firearm while providing accurate windage and elevation adjustments.

9. The system of claim 1 wherein said battery is rechargeable.

10. The system of claim 9 wherein said battery is rechargeable while installed in said holographic sighting system.

11. The system of claim 1 further comprising a laser diode carrier for mounting said laser diode light.

12. The system of claim 11 wherein said laser diode carrier is attached to a flexible circuit that allows said laser diode to be adjusted via a set of alignment controllers connected between said lower housing assembly and to said laser diode carrier.

13. The system of claim 12 wherein said set of alignment controllers further comprise tensioning springs that provide an outward bias to said laser diode carrier that opposes the tightening action of said set of alignment controllers and eliminates hysteresis during focusing.

14. The system of claim 12 further comprising a locking screw to fix the laser diode carrier in a focused position once adjusted with said set of alignment controllers.

15. The system of claim 14 wherein said set of alignment controllers and said locking screw are adjusted with an alignment tool.

16. The system of claim 1 further comprising a laser diode carrier for mounting said laser diode light source.

17. The system of claim 16 wherein said laser diode carrier is attached to a flexible circuit that allows said laser diode light source to be adjusted via a set of alignment controllers connected between said lower housing assembly and to said laser diode carrier.

18. The system of claim 17 wherein said set of alignment controllers further comprise tensioning springs that provide an outward bias to said laser diode carrier that opposes the tightening action of said set of alignment controllers and eliminates hysteresis during focusing.

19. The system of claim 17 further comprising a locking screw to fix the laser diode carrier in a focused position once adjusted with said set of alignment controllers.

20. The system of claim 19 wherein said set of alignment controllers and said locking screw are adjusted with an alignment tool.

21. The system of claim 1 wherein said prism and said holographic transmission grating are positioned in said lower housing assembly.

* * * * *